US011190025B2

(12) United States Patent
Kawamoto et al.

(10) Patent No.: US 11,190,025 B2
(45) Date of Patent: Nov. 30, 2021

(54) CONTROL APPARATUS, CONTROL METHOD, AND POWER STORAGE CONTROL APPARATUS

(71) Applicant: SONY CORPORATION, Tokyo (JP)

(72) Inventors: Daisuke Kawamoto, Kanagawa (JP); Tadashi Morita, Tokyo (JP); Mario Tokoro, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/083,299

(22) PCT Filed: Apr. 3, 2017

(86) PCT No.: PCT/JP2017/013932
§ 371 (c)(1),
(2) Date: Sep. 7, 2018

(87) PCT Pub. No.: WO2017/199604
PCT Pub. Date: Nov. 23, 2017

(65) Prior Publication Data
US 2019/0086891 A1 Mar. 21, 2019

(30) Foreign Application Priority Data
May 16, 2016 (JP) .............................. JP2016-098255

(51) Int. Cl.
*H02J 7/00* (2006.01)
*H02J 3/00* (2006.01)
(Continued)

(52) U.S. Cl.
CPC .............. *H02J 7/00* (2013.01); *G05B 19/048* (2013.01); *H02J 3/00* (2013.01); *H02J 3/28* (2013.01);
(Continued)

(58) Field of Classification Search
None
See application file for complete search history.

(56) References Cited

U.S. PATENT DOCUMENTS

| 7,430,545 B2 | 9/2008 | Kanbara et al. |
| 2003/0078797 A1 | 4/2003 | Kanbara et al. |

(Continued)

FOREIGN PATENT DOCUMENTS

| CN | 105706332 A | 6/2016 |
| EP | 1255340 A1 | 11/2002 |

(Continued)

OTHER PUBLICATIONS

International Search Report and Written Opinion of PCT Application No. PCT/JP2017/013932, dated May 9, 2017, 10 pages.
(Continued)

*Primary Examiner* — Sean Shechtman
(74) *Attorney, Agent, or Firm* — Chip Law Group

(57) ABSTRACT

[Object] To provide a control apparatus capable of optimum power interchange in the whole of a community including a plurality of customers. [Solution] There is provided a control apparatus including: an acquisition section configured to acquire information regarding consumption of power from a plurality of nodes that store and consume power; and a control section configured to use the information regarding consumption of power to generate data regarding target power storage in each of the nodes, the data being provided to the node.

11 Claims, 8 Drawing Sheets

(51) Int. Cl.
*H02J 13/00* (2006.01)
*H02J 3/32* (2006.01)
*H02J 7/34* (2006.01)
*G05B 19/048* (2006.01)
*H02J 3/28* (2006.01)

(52) U.S. Cl.
CPC ............... *H02J 3/32* (2013.01); *H02J 7/34* (2013.01); *H02J 13/00* (2013.01); *H02J 13/0006* (2013.01); *G05B 2219/2639* (2013.01); *H02J 3/003* (2020.01); *Y02E 40/70* (2013.01); *Y04S 10/50* (2013.01)

(56) References Cited

U.S. PATENT DOCUMENTS

| | | | |
|---|---|---|---|
| 2013/0162037 A1 | 6/2013 | Kim et al. | |
| 2014/0049109 A1* | 2/2014 | Kearns | H02J 3/00 307/52 |
| 2014/0142774 A1 | 5/2014 | Katayama et al. | |
| 2016/0011577 A1 | 1/2016 | Schwarz et al. | |
| 2016/0248261 A1 | 8/2016 | Tokuda et al. | |
| 2016/0276832 A1 | 9/2016 | Kawai et al. | |

FOREIGN PATENT DOCUMENTS

| | | |
|---|---|---|
| EP | 2894747 A1 | 7/2015 |
| EP | 3070813 A1 | 9/2016 |
| JP | 2006-288162 A | 10/2006 |
| JP | 3881625 B2 | 2/2007 |
| JP | 2008-067418 A | 3/2008 |
| JP | 2014-050275 A | 3/2014 |
| JP | 2014-096866 A | 5/2014 |
| JP | 2015-056976 A | 3/2015 |
| JP | 2015-077014 A | 4/2015 |
| JP | 5921390 B2 | 5/2016 |
| KR | 10-2013-0074046 A | 7/2013 |
| WO | 02/29952 A1 | 4/2002 |
| WO | 2002/29952 A1 | 4/2002 |
| WO | 2014/034391 A1 | 3/2014 |
| WO | 2015/053195 A1 | 4/2015 |
| WO | 2015/072304 A1 | 5/2015 |

OTHER PUBLICATIONS

Extended European Search Report of EP Patent Application No. 17799038.9, dated Jan. 22, 2019, 07 pages.
Office Action for JP Patent Application No. 2018-518143, dated Feb. 9, 2021, 7 pages of Office Action and 7 pages of English Translation.

* cited by examiner

CONTROL APPARATUS, CONTROL METHOD, AND POWER STORAGE CONTROL APPARATUS

CROSS REFERENCE TO RELATED APPLICATIONS

This application is a U.S. National Phase of International Patent Application No. PCT/JP2017/013932 filed on Apr. 3, 2017, which claims priority benefit of Japanese Patent Application No. JP 2016-098255 filed in the Japan Patent Office on May 16, 2016. Each of the above-referenced applications is hereby incorporated herein by reference in its entirety.

TECHNICAL FIELD

The present disclosure relates to a control apparatus, a control method, and a power storage control apparatus.

BACKGROUND ART

An uninterruptible power source apparatus has been known that includes a storage battery, and can hereby keep on supplying power from the storage battery to an apparatus connected thereto for a predetermined time without causing power interruptions even when power from an input power source is cut off. Technology has been developed for supplying power to customers in which such a power source apparatus is provided when an abnormality occurs in supplying power due to power interruption or the like (see Patent Literature 1, Patent Literature 2, and the like).

CITATION LIST

Patent Literature

Patent Literature 1: JP 2015-056976A
Patent Literature WO2015/072304

DISCLOSURE OF INVENTION

Technical Problem

When power is autonomously interchanged between customers, storage batteries installed at the respective customers are individually optimized. However, when power is autonomously interchanged between customers, the optimization is not carried out in the whole of a community including a plurality of customers, failing in efficient energy use.

Accordingly, the present disclosure proposes a novel and improved control apparatus, control method, and power storage control apparatus capable of optimum power interchange in the whole of a community including a plurality of customers.

Solution to Problem

According to the present disclosure, there is provided a control apparatus including: an acquisition section configured to acquire information regarding consumption of power from a plurality of nodes that store and consume power; and a control section configured to use the information regarding consumption of power to generate data regarding target power storage in each of the nodes, the data being provided to the node.

In addition, according to the present disclosure, there is provided a control method including: acquiring information regarding consumption of power from a plurality of nodes that store and consume power; and using the information regarding consumption of power to generate data regarding target power storage in each of the nodes, the data being provided to the node.

In addition, according to the present disclosure, there is provided a power storage control apparatus including: an acquisition section configured to acquire data regarding target power storage, the data being generated in an apparatus to which information regarding consumption of power is provided; and a control section configured to perform control regarding interchange of power stored in a storage battery on a basis of the data regarding target power storage.

In addition, according to the present disclosure, there is provided a control method including: acquiring data regarding target power storage, the data being generated in an apparatus to which information regarding consumption of power is provided; and performing control regarding interchange of stored power on a basis of the data regarding target power storage.

Advantageous Effects of Invention

According to the present disclosure as described above, it is possible to provide a novel and improved control apparatus, control method, and power storage control apparatus capable of optimum power interchange in the whole of a community including a plurality of customers.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
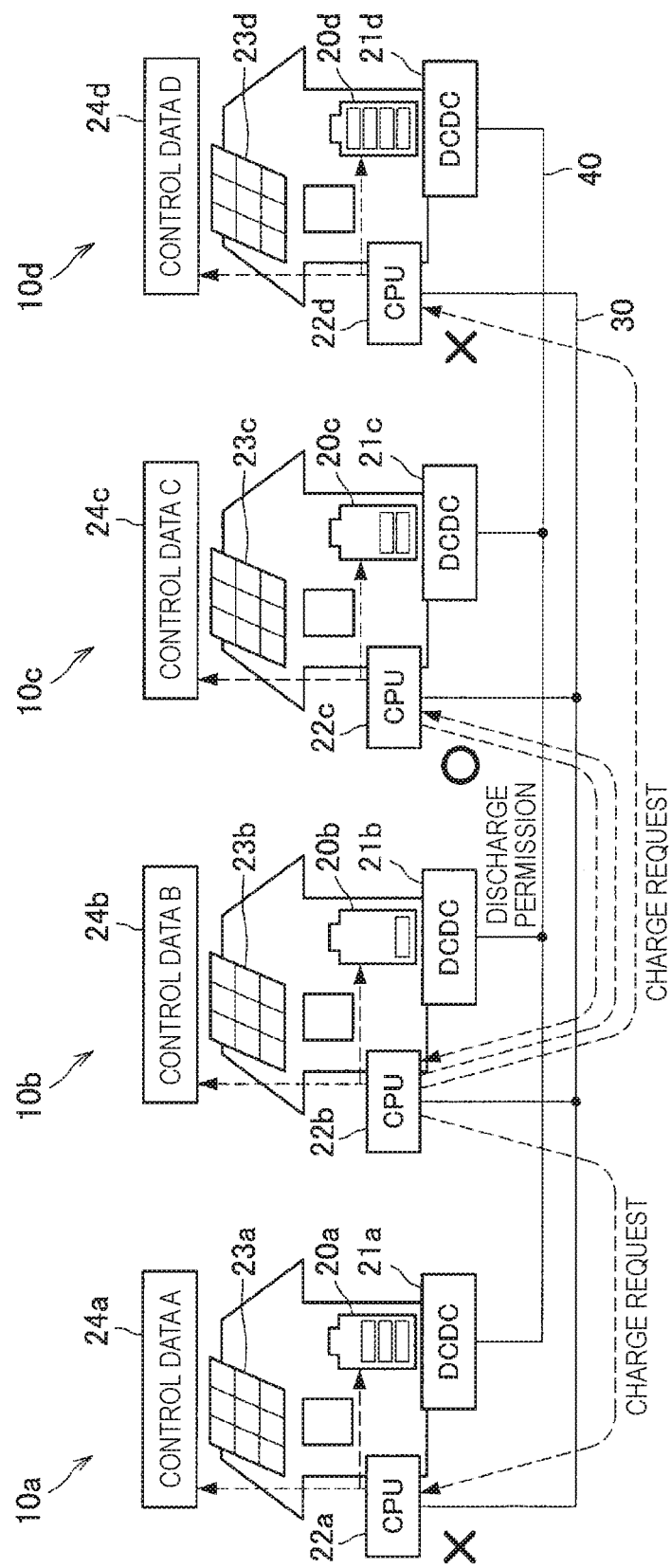
FIG. 1 is an explanatory diagram illustrating a configuration example of a power supply system in which power stored in batteries is interchanged between nodes.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.
1. Embodiment of the Present Disclosure
1.1. Overview
1.2. Configuration Example and Operation Example
2. Conclusion

1. Embodiment of the Present Disclosure

1.1. Overview

Before an embodiment of the present disclosure is described in detail, the overview of the embodiment of the present disclosure will be described.

As described above, the technology is disclosed for a power supply system in which, between nodes each including a power generation apparatus such as a solar power generation apparatus that uses natural energy and renewable energy to generate power and a battery that stores the power generated by the power generation apparatus, the power stored in the batteries is interchanged (see Patent Literature 1 and the like).

Technology is also disclosed for a system in which power is autonomously interchanged between the respective nodes in such a power supply system (see Patent Literature 2 and the like). Autonomously interchanging power between nodes individually optimizes the respective batteries.

FIG. 1 is an explanatory diagram illustrating a configuration example of a power supply system in which power stored in batteries is interchanged between nodes.

FIG. 1 illustrates four nodes 10*a* to 10*d*. Each node is one power generation and power consumption unit including, for example, a home, a company, a school, a hospital, a city office, and the like. The nodes 10*a* to 10*d* are connected through a communication line 30 and a power line 40.

The node 10*a* includes a storage battery 20*a*, a DC-DC converter 21*a*, a CPU 22*a*, and a solar power generation apparatus 23*a*. Then, the node 10*a* retains control data 24*a*. The control data 24*a* is data for controlling a charge and discharge of the storage battery 20*a*. The control data 24*a* is data in which it is described, for example, how low the remaining power level of the storage battery 20*a* becomes when a charge request is sent to another node, how high the remaining power level of the storage battery 20*a* becomes when a discharge is permitted in response to a charge request from another node, or the like. The nodes 10*b* to 10*d* also have similar configurations.

In the power supply system illustrated in FIG. 1, the respective nodes 10*a* to 10*d* autonomously interchange power. For example, a CPU 22*b* refers to control data 24*b* and the remaining power level of a storage battery 20*b*. If the remaining capacity of the storage battery 20*b* of the node 10*b* is lowered to such a level that a charge request is sent to another node, the CPU 22*b* sends charge requests to the other nodes 10*a*, 10*c*, and 10*d* through the communication line 30. The nodes 10*a*, 10*c*, and 10*d*, which receive the charge requests from the node 10*b*, respectively refer to the pieces of control data 24*a*, 24*c* and 24*d*, and the remaining power levels of the storage batteries 20*a*, 20*c*, and 20*d* to determine whether to permit discharges.

The example of FIG. 1 shows that only the node 10*c* permits a discharge in response to a charge request from the node 10*b*. As a result, power is interchanged between the node 10*b* and the node 10*c*.

In such a power supply system, pieces of control data are independently decided in the respective nodes. Therefore, the system does not always carry out the optimum power interchange as a whole. In other words, autonomous power interchange between a plurality of nodes does not sometimes result in the optimum power interchange as the whole of a community including the nodes. In that case, it is impossible to efficiently use the generated energy. For example, another node whose battery is fully charged as a result of power interchange from a certain node to the other node cannot store the power generated by the power generation apparatus in the battery. The power generated by the power generation apparatus comes to nothing.

In the example of FIG. 1, power is interchanged between the node 10*b* and the node 10*c*, whose batteries have relatively low remaining power levels. To maximize the efficiency of the whole of the system, it is desirable to transmit power from the node 10*a* and the node 10*d*, whose batteries have relatively high remaining power levels, to the node 10*b*. In addition, in the example of FIG. 1, the remaining power level of the storage battery 20*d* is almost full. Unless power is transmitted from the node 10*d*, the power generated by a solar power generation apparatus 23*d* is not stored in the storage battery 20*d* or comes to nothing.

Thus, when pieces of control data on the basis of which the power stored in the storage batteries is interchanged are independently decided in the respective nodes, it is impossible to efficiently use the generated energy in some cases.

Then, in view of what has been described above, the present disclosers have assiduously studied technology capable of carrying out the optimum power interchange on the whole of a community including a plurality of customers. As a result, the present disclosers have devised technology capable of efficiently using generated energy by providing a plurality of nodes with a central control apparatus that controls power interchange.

The above describes the overview of an embodiment of the present disclosure.

1.2. Configuration Example and Operation Example

System Configuration Example

Figure 2:
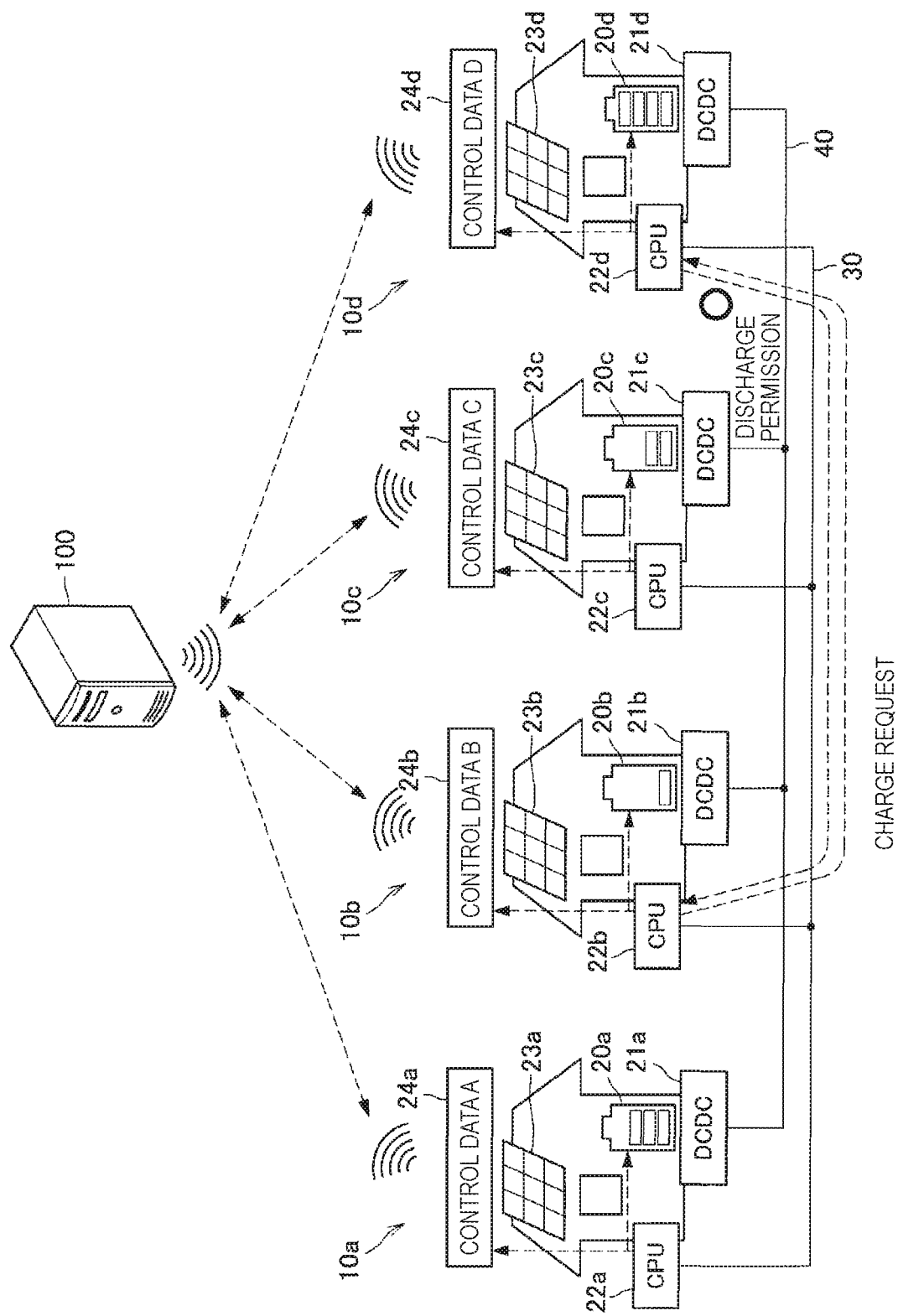
FIG. 2 is an explanatory diagram illustrating an overall configuration example of a power supply system according to an embodiment of the present disclosure.

First, an overall configuration example of the power supply system according to an embodiment of the present disclosure will be described. FIG. 2 is an explanatory diagram illustrating an overall configuration example of a power supply system according to an embodiment of the present disclosure. The following uses FIG. 2 to describe an overall configuration example of the power supply system according to an embodiment of the present disclosure.

As illustrated in FIG. 2, the power supply system according to an embodiment of the present disclosure includes the nodes 10*a* to 10*d* and a central control apparatus 100. Each node is one power generation and power consumption unit including, for example, a home, a company, a school, a hospital, a city office, and the like. The nodes 10*a* to 10*d* are connected through the communication line 30 and the power line 40. Note that FIG. 1 illustrates the four nodes 10a to 10d, but, needless to say, the number of nodes included in the power supply system is not limited to this example.

The node 10a includes the storage battery 20a, the DC-DC converter 21a, the CPU 22a, and the solar power generation apparatus 23a. Then, the node 10a retains control data 24a. The control data 24a is data for controlling a charge and discharge of the storage battery 20a. The control data 24a is data in which it is described, for example, how low the remaining power level of the storage battery 20a becomes when a charge request is sent to another node, how high the remaining power level of the storage battery 20a becomes when a discharge is permitted in response to a charge request from another node, or the like. The nodes 10b to 10d also have similar configurations.

The central control apparatus 100 has a function of performing wired or wireless communication with the nodes 10a to 10d, and regularly updating the pieces of control data 24a to 24d retained by the respective nodes such that the whole of the system has the optimum energy efficiency. A specific functional configuration example of the central control apparatus 100 will be described in detail below.

In addition, update processing of the pieces of control data 24a to 24d by the central control apparatus 100 will also be described in detail below, but an example is like the following. The central control apparatus 100 acquires data (consumption history data or consumption prediction data) regarding the consumption of power from the respective nodes, updates the pieces of control data 24a to 24d on the basis of the acquired data, and provides them to the respective nodes. The central control apparatus 100 may predict future consumed power on the basis of future weather and temperature, the predicted amount of solar radiation, information of an event that takes place in a region to which each node belongs, and the like, and use a result of the prediction to update the pieces of control data 24a to 24d.

In other words, it is the same as the power supply system illustrated in FIG. 1 that the nodes 10a to 10d respectively send charge requests and discharge permission on the basis of the pieces of control data 24a to 24d and the remaining power levels of the storage batteries 20a to 20d. However, it is different from the power supply system illustrated in FIG. 1 that the pieces of control data 24a to 24d are regularly updated by the central control apparatus 100.

The power supply system according to an embodiment of the present disclosure is configured as illustrated in FIG. 2, and the respective nodes 10a to 10d hereby interchange power under the control of the central control apparatus 100. For example, the CPU 22b refers to the control data 24b and the remaining power level of the storage battery 20b. If the remaining capacity of the storage battery 20b of the node 10b is lowered to such a level that a charge request is sent to another node, the CPU 22b sends charge requests to the other nodes 10a, 10c, and 10d through the communication line 30. The nodes 10a, 10c, and 10d, which receive the charge requests from the node 10b, respectively refer to the pieces of control data 24a, 24c and 24d, and the remaining power levels of the storage batteries 20a, 20c, and 20d to determine whether to permit discharges.

The example of FIG. 2 shows that only the node 10d including the storage battery 20d, whose remaining power level is almost full, permits a discharge in response to a charge request from the node 10b. As a result, power is interchanged between the node 10b and the node 10d. Thus, the power supply system according to an embodiment of the present disclosure illustrated in FIG. 2 can realize more efficient energy interchange than the power supply system illustrated in FIG. 1 does.

The above uses FIG. 2 to describe an overall configuration example of the power supply system according to an embodiment of the present disclosure. Next, functional configuration examples of the respective nodes 10a to 10d and the central control apparatus 100 included in the power supply system according to an embodiment of the present disclosure will be described.

Functional Configuration Examples of Nodes and Central Control Apparatus

Figure 3:
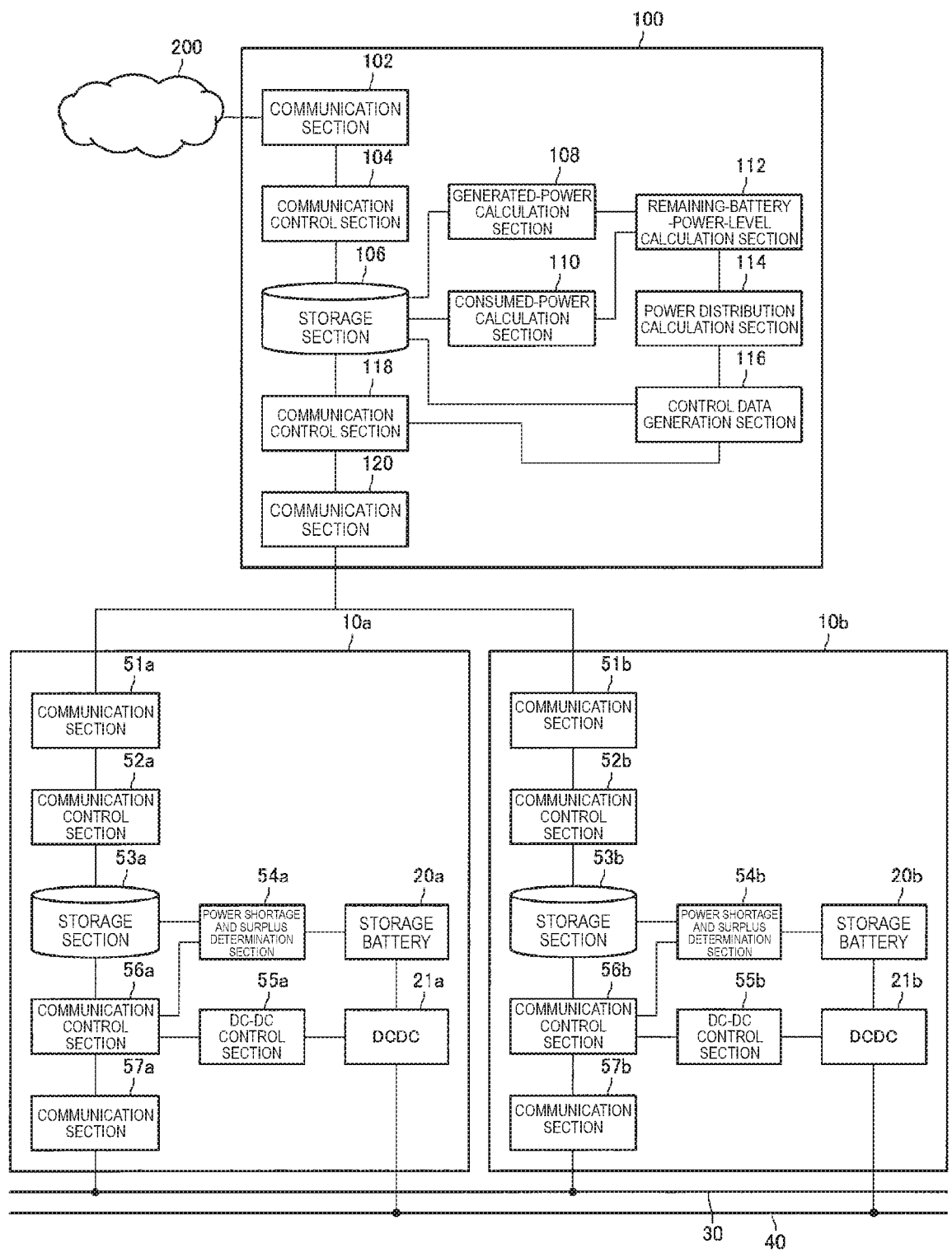
FIG. 3 is an explanatory diagram illustrating functional configuration examples of nodes 10*a* and 10*b* and a central control apparatus 100 included in the power supply system according to an embodiment of the present disclosure.

FIG. 3 is an explanatory diagram illustrating functional configuration examples of the nodes 10a and 10b and the central control apparatus 100 included in the power supply system according to an embodiment of the present disclosure. The following uses FIG. 3 to describe functional configuration examples of the nodes 10a and 10b and the central control apparatus 100. Note that FIG. 3 illustrates only the nodes 10a and 10b, but the nodes 10c and 10d in FIG. 2 also have configurations similar to those of the nodes 10a and 10b.

First, functional configuration examples of the nodes 10a and 10b will be described. The following describes a functional configuration example of the node 10a, but the same applies to a functional configuration example of the node 10b.

As illustrated in FIG. 3, the node 10a according to an embodiment of the present disclosure includes the storage battery 20a, the DC-DC converter 21a, communication sections 51a and 57a, communication control sections 52a and 56a, a storage section 53a, a power shortage and surplus determination section 54a, and a DC-DC control section 55a.

The communication section 51a executes communication processing with the central control apparatus 100. The communication control section 52a controls the communication processing by the communication section 51a. The communication section 51a transmits data (consumption history data or consumption prediction data) regarding the consumption of power to the central control apparatus 100, and receives control data 24a from the central control apparatus 100 according to the communication processing with central control apparatus 100.

The storage section 53a includes, for example, a recording medium such as a hard disk drive (HDD), and retains information regarding power interchange with another node, for example, the control data 24a.

The power shortage and surplus determination section 54a refers to the amount of power stored in the storage battery 20a and the control data 24a stored in the storage section 53a to determine a shortage or surplus of the power stored in the storage battery 20a.

When the power shortage and surplus determination section 54a determines that the power stored in the storage battery 20a runs short, the power shortage and surplus determination section 54a instructs the communication control section 56a to send a charge request to another node. When the power shortage and surplus determination section 54a determines that the power stored in the storage battery 20a is sufficient to transmit power in the case where the power shortage and surplus determination section 54a receives a charge request from another node, the power shortage and surplus determination section 54a instructs the communication control section 56a to send power transmission permission to the other node. The power shortage and surplus determination section 54*a* can function as an example of a control section of a power storage control apparatus according to the present disclosure.

An example of the control data 24*a* will be shown here. Table 1 is an explanatory diagram illustrating an example of the control data 24*a*. The control data 24*a* is, as illustrated in Table 1, data in which the target remaining power level, the interchange price, and the interchange partner for each time slot are described. The power shortage and surplus determination section 54*a* refers to the control data 24*a* like this to determine a shortage or surplus of the power stored in the storage battery 20*a*.

TABLE 1

(Example of Control Data)

| | target remaining power level (A) | interchange price (Option) | interchange partner (Option) |
|---|---|---|---|
| 0:00 to 1:00 | 40% | ¥40 | anyone |
| 1:00 to 2:00 | 38% | ¥40 | anyone |
| 2:00 to 3:00 | 36% | ¥40 | anyone |
| 3:00 to 4:00 | 34% | ¥40 | anyone |
| 4:00 to 5:00 | 32% | ¥40 | anyone |
| 5:00 to 6:00 | 30% | ¥30 | anyone |
| 6:00 to 7:00 | 20% | ¥30 | anyone |
| 7:00 to 8:00 | 20% | ¥20 | anyone |
| 8:00 to 9:00 | 20% | ¥20 | A |
| 9:00 to 10:00 | 20% | ¥20 | A |
| 10:00 to 11:00 | 20% | ¥20 | A |
| 11:00 to 12:00 | 30% | ¥20 | anyone |
| 12:00 to 13:00 | 40% | ¥20 | anyone |
| 13:00 to 14:00 | 50% | ¥20 | anyone |
| 14:00 to 15:00 | 60% | ¥20 | anyone |
| 15:00 to 16:00 | 70% | ¥20 | anyone |
| 16:00 to 17:00 | 80% | ¥30 | B |
| 17:00 to 18:00 | 75% | ¥30 | B |
| 18:00 to 19:00 | 70% | ¥30 | B |
| 19:00 to 20:00 | 65% | ¥30 | anyone |
| 20:00 to 21:00 | 60% | ¥30 | anyone |
| 21:00 to 22:00 | 55% | ¥30 | anyone |
| 22:00 to 23:00 | 50% | ¥30 | anyone |
| 23:00 to 24:00 | 45% | ¥30 | anyone |

The target remaining power level is the remaining power level of the storage battery 20*a* in that time slot, and may be described in percentages like the example of the control data illustrated in Table 1 or as an absolute value. The interchange price is the amount of money for interchanging power in that time slot. The interchange partner is a partner with which power can be interchanged in that time slot. If power can be interchanged with any node, "anyone" is described. If power can be interchanged with only a specific node, information for identifying that node is described. In the case where power can be interchanged with only a specific node, the number of pieces of information for identifying the node may be one or more. In addition, the setting is also possible that does not interchange power with the specific node.

The control data 24*a* has a function of controlling power interchange with an external power source. For example, in the case where bad weather is expected, the control data 24*a* for purchasing power from an electric power company in a time slot such as a nighttime power service that costs less, and fully charging the storage battery 20*a* can be generated by the central control apparatus 100. In addition, in the case where fine weather is expected, the control data 24*a* for selling the power of the storage battery to an electric power company, and keeping the storage battery empty as long as possible to take in as much solar power as possible can be generated by the central control apparatus 100.

The DC-DC control section 55*a* controls the DC-DC converter 21*a* to control a discharge of direct current power from the storage battery 20*a* and a supply of direct current power to the storage battery 20*a*. The DC-DC control section 55*a* is based on a charge request or discharge permission acquired by the communication control section 56*a* to control to what extent and how long power is discharged or supplied.

The communication section 57*a* executes communication processing with another node through the communication line 30. The communication control section 56*a* controls the communication processing by the communication section 57*a*. The communication section 57*a* transmits a charge request or discharge permission to the other node, or receives a charge request or discharge permission from the other node according to the communication processing with the other node.

The above describes functional configuration examples of the nodes 10*a* and 10*b*. Next, a functional configuration example of the central control apparatus 100 will be described.

As illustrated in FIG. 3, the central control apparatus 100 according to an embodiment of the present disclosure includes communication sections 102 and 120, communication control sections 104 and 118, a storage section 106, a generated-power calculation section 108, a consumed-power calculation section 110, a remaining-battery-power-level calculation section 112, a power distribution calculation section 114, and a control data generation section 116.

The communication section 102 executes communication processing with an external cloud 200. The communication control section 104 controls the communication processing by the communication section 102. The communication section 102 acquires future weather data of a region to which the nodes 10*a* to 10*d* belong, the region to which the nodes 10*a* to 10*d* belong, information of an event in the area (such as a town, a city, a prefecture, and a country) to which the region belongs, or other information that can relate to power consumption according to the communication processing with the external cloud 200.

The storage section 106 includes, for example, a recording medium such as a hard disk drive (HDD), and retains information regarding inter-node power interchange between the nodes 10*a* to 10*d*, for example, information that can relate to power consumption which is acquired by the communication section 102 and control data to be provided to each node. The control data retained by the storage section 106 can be control data that is transmitted from each node or generated by the control data generation section 116.

The generated-power calculation section 108 calculates the power generated by a solar power generation apparatus installed at each node. When the generated-power calculation section 108 calculates the power generated by the solar power generation apparatus installed at each node, the generated-power calculation section 108 uses, for example, the future weather data that is acquired by the communication section 102 and stored in the storage section 106.

In addition, when the generated-power calculation section 108 calculates the power generated by the solar power generation apparatus installed at each node, the generated-power calculation section 108 may use the history of the amount of power generated in the past by the solar power generation apparatus installed at the node. For example, referring to the amount of power generated on one day in the past, and the weather, temperature and sunshine duration of that day, the generated-power calculation section 108 can predict the more accurate value of the amount of power generated by the solar power generation apparatus installed at each node from future weather data.

Note that the present embodiment shows an example in which a solar power generation apparatus is installed at each node. However, for example, if a wind power generation apparatus is additionally installed at each node, the generated-power calculation section 108 can calculate the power generated by the wind power generation apparatus installed at the node. When the generated-power calculation section 108 calculates the power generated by the wind power generation apparatus, the generated-power calculation section 108 refers to information, for example, a wind direction and wind strength that influence the power generation of the wind power generation apparatus as future weather data.

The consumed-power calculation section 110 calculates the power consumed by each node. When the consumed-power calculation section 110 calculates the power consumed by each node, the consumed-power calculation section 110 uses, for example, information that is acquired by the communication section 102 and stored in the storage section 106, and can relate to power consumption.

For example, if the information acquired by the communication section 102 notifies the consumed-power calculation section 110 that a sport event is going to take place on one day in the future, the consumed-power calculation section 110 calculates consumed power by taking it into consideration that more people are each viewing television at home. In addition, for example, if the information acquired by the communication section 102 notifies the consumed-power calculation section 110 that temperature is going to rise on one day in the future, the consumed-power calculation section 110 calculates consumed power by taking it into consideration that more people are each using an air conditioner at home. In addition, for example, if the information acquired by the communication section 102 notifies the consumed-power calculation section 110 that a festival is going to take place in a region to which each node belongs on one day in the future, the consumed-power calculation section 110 calculates consumed power by taking it into consideration that each of people is absent at home in the time slot of the festival.

The remaining-battery-power-level calculation section 112 uses the power generated by the solar power generation apparatus which is calculated by the generated-power calculation section 108, and the power consumed by each node which is calculated by the consumed-power calculation section 110 to calculate the future remaining power level of the storage battery of the node.

The power distribution calculation section 114 is based on the future remaining power level of the storage battery of each node which is calculated by the remaining-battery-power-level calculation section 112 to calculate the distribution amount of power to be interchanged between nodes. For example, to take in as much generated power as possible from renewable energy, the power distribution calculation section 114 calculates such a distribution amount that the power distribution is achieved for charging a storage battery having a charge spare capacity from a storage battery having a discharge spare capacity.

The control data generation section 116 is based on the distribution amount of power to be interchanged between nodes which is calculated by the power distribution calculation section 114 to generate control data to be provided to each node. The control data generated by the control data generation section 116 is data of the target remaining power level, the interchange price, and the interchange partner for each time slot like the data illustrated in Table 1. The control data generation section 116 can function as an example of a control section of a control apparatus according to the present disclosure.

The communication section 120 executes communication processing with each node. The communication control section 1187 controls the communication processing by the communication section 120. The communication section 120 can provide the control data generated by the control data generation section 116 to each node, and acquire the history of the power generated and the history of the power consumed by each node, the history of interchange power with another node and the like from the node according to the communication processing with the node.

Configured in this way, the central control apparatus 100 according to an embodiment of the present disclosure can generate control data to be provided to each node on the basis of information regarding future power consumption, and provide the generated control data to the node.

The above uses FIG. 3 to describe functional configuration examples of the nodes 10a and 10b and the central control apparatus 100. Next, an operation example of the central control apparatus 100 according to an embodiment of the present disclosure will be described.

Operation Example

Figure 4:
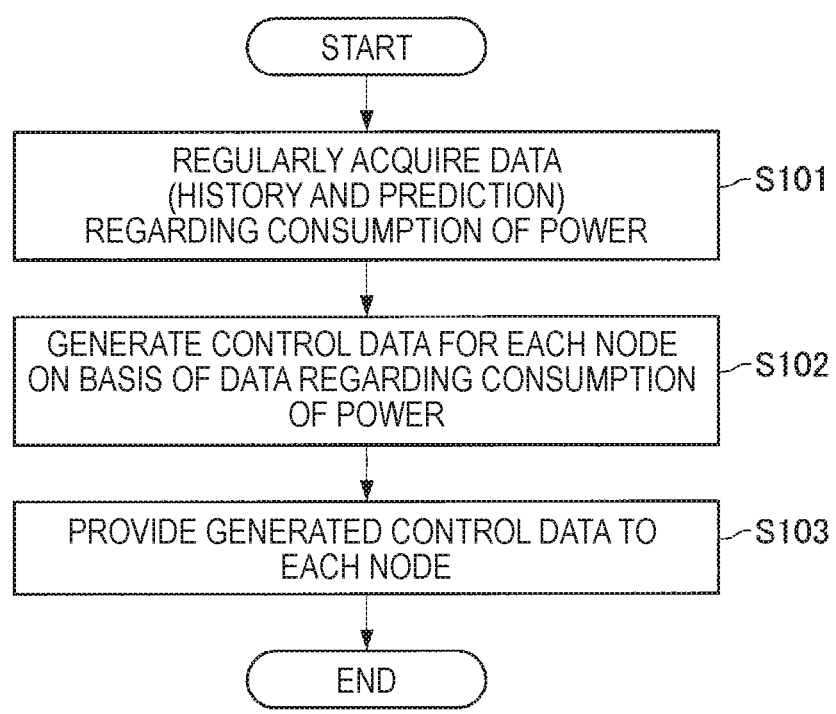
FIG. 4 is a flowchart illustrating an operation example of the central control apparatus 100 according to an embodiment of the present disclosure.

FIG. 4 is a flowchart illustrating an operation example of the central control apparatus 100 according to an embodiment of the present disclosure. What is illustrated in FIG. 4 is an operation example of the central control apparatus 100 to generate control data for each node. The following uses FIG. 4 to describe an operation example of the central control apparatus 100 according to an embodiment of the present disclosure.

The central control apparatus 100 regularly acquires data regarding the power consumption of each node from the cloud 200 or the node (step S101). The data regarding the power consumption of each node is the data of the history of power consumed in the past by the node or the prediction of the future power generation and consumption of the node.

Regularly acquiring the data regarding the power consumption of each node from the cloud 200 or the node, the central control apparatus 100 is then based on the acquired data regarding the power consumption to generate control data for each node (step S102). When the central control apparatus 100 generates control data, the central control apparatus 100 uses a calculation result of the remaining power level of the storage battery of each node and the distribution amount of power between nodes which are derived from a calculation result of the power generated by the solar power generation apparatus installed at the node and a calculation result of the power consumed by the node.

Generating control data for each node, the central control apparatus 100 then provides the generated control data to the node (step S103).

The central control apparatus 100 regularly generates control data. For example, the central control apparatus 100 can generate control data at predetermined intervals, for example, various intervals such as every one hour, every six hours, every half a day, and every day.

Here, the flow in which the central control apparatus 100 generates control data will be described in further detail while specific information is presented.

Figure 5:
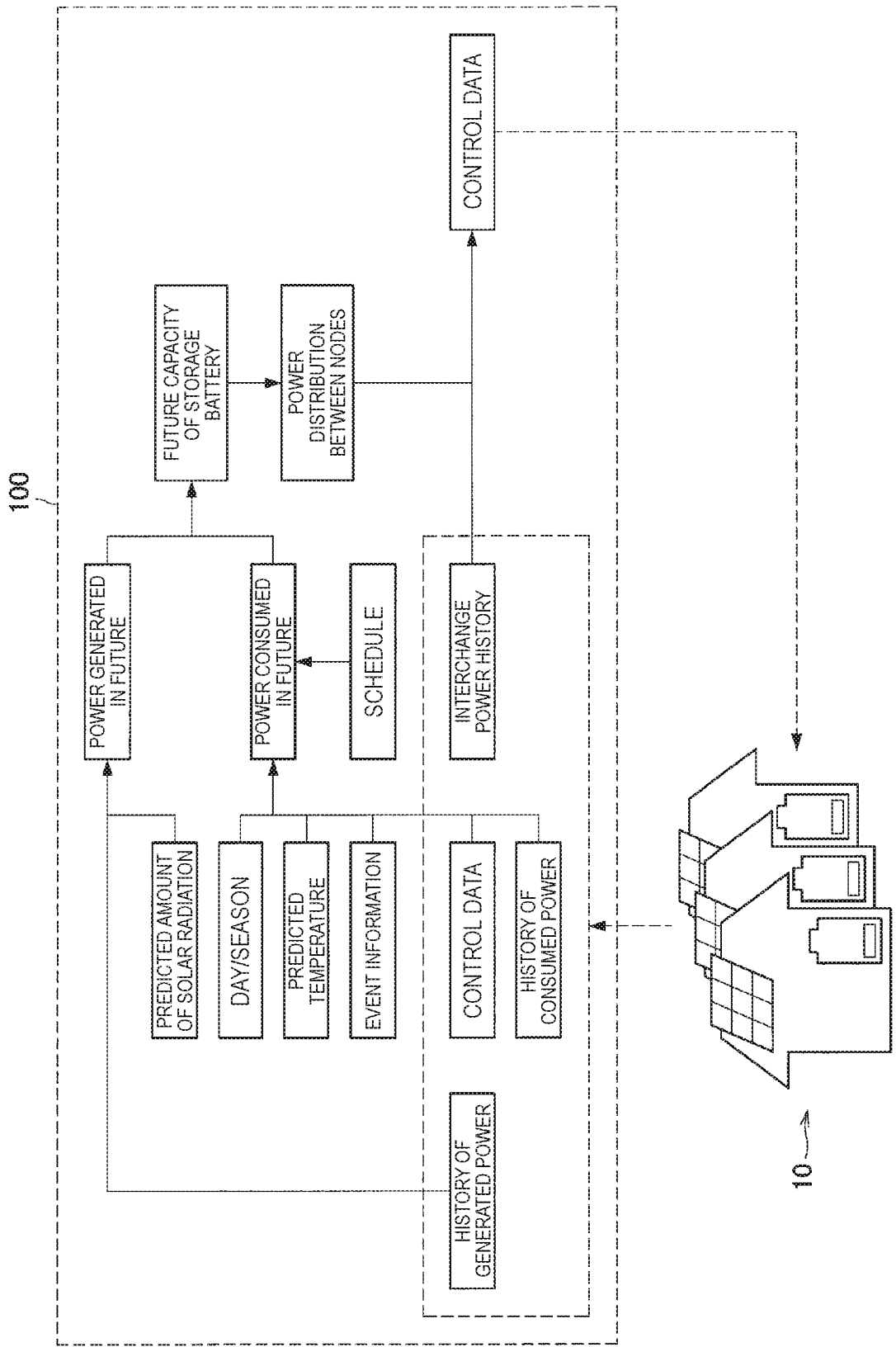
FIG. 5 is an explanatory diagram for describing a flow in which control data is generated by the central control apparatus 100 according to an embodiment of the present disclosure.

FIG. 5 is an explanatory diagram for describing a flow in which control data is generated by the central control apparatus 100 according to an embodiment of the present disclosure.

The central control apparatus 100 acquires, from each node 10, information such as the history of the power generated by the solar power generation apparatus, the history of the power consumed by the node, the history of interchange power with another node, and control data uniquely retained in the node.

In addition, the central control apparatus 100 acquires, for example, from the cloud 200, information such as the predicted amount of solar radiation in a region to which each node belongs which influences the power generation of the solar power generation apparatus and information such as predicted temperature, a day/season and event information which influences the amount of power consumed in the future.

The central control apparatus 100 uses the history of the generated power acquired from each node 10 and, for example, the predicted amount of solar radiation acquired from the cloud 200 to calculate the power generated in the future by the solar power generation apparatus installed at the node 10.

In addition, the central control apparatus 100 is based on the information, for example, the predicted amount of solar radiation acquired from the cloud 200 and the like which influences the power generation of the solar power generation apparatus, the information such as predicted temperature, a day/season and event information which influences the amount of power consumed in the future, and the control data and the history of the consumed power which are acquired from each node 10 to calculate the power consumed by the node in the future.

When the central control apparatus 100 calculates the power consumed in the future by each node, the central control apparatus 100 may use a schedule of a person who resides in the node. The central control apparatus 100 can predict that, if a person who resides in each node goes out, less power is consumed, while the central control apparatus 100 can predict that, if a person who resides in each node does not go out, more power is consumed.

Once the central control apparatus 100 calculates the power generated in the future by the solar power generation apparatus installed at each node 10 and the power consumed in the future by the node, the central control apparatus 100 is based on a calculation result to calculate the future remaining capacity of the storage battery of the node.

Once the central control apparatus 100 calculates the future remaining capacity of the storage battery of each node, the central control apparatus 100 is based on a calculation result to decide future power distribution between nodes. For example, knowing that the remaining capacity of the storage battery 20a of the node 10a is running short at a certain time point in the future while the storage battery 20b of the node 10b has a spare remaining capacity, the central control apparatus 100 decides that power is interchanged from the node 10b to the node 10a at that time.

Then, once the central control apparatus 100 decides future power distribution between nodes, the central control apparatus 100 generates such control data for each node that the power distribution is carried out. For example, as described above, knowing that the remaining capacity of the storage battery 20a of the node 10a is running short at a certain time point in the future while the storage battery 20b of the node 10b has a spare remaining capacity, the central control apparatus 100 generates such control data that power is interchanged from the node 10b to the node 10a at that time.

When the central control apparatus 100 generates control data, the central control apparatus 100 may refer to the past power interchange history acquired from each node. For example, if power is frequently interchanged between the node 10a and the node 10b, such control data may be generated that power is interchanged between the node 10a and the node 10b. In addition, such control data may also be generated that power is interchanged between nodes other than the node 10a and the node 10b.

The central control apparatus 100 may determine from the interchange power history and remaining-battery-power history of each node whether the interchange is effective. Then, in the case where the interchange of each node is not effective, the central control apparatus 100 may generate such control data that the interchange does not occur under the same condition.

For example, if the interchange power history and the remaining-battery-power history notify the central control apparatus 100 that the storage battery of a node that receives power by interchanging power is fully charged afterward, and the situation occurs in which solar power cannot be taken in, the central control apparatus 100 determines that the interchange is not effective and generates such control data that the same power interchange does not occur under the same condition.

Once the central control apparatus 100 generates control data for each node, the central control apparatus 100 provides the generated control data to the node 10.

Executing an operation as described above, the central control apparatus 100 according to an embodiment of the present disclosure can generate control data to be provided to each node on the basis of information regarding future power consumption, and provide the generated control data to the node.

In this way, each node 10 can interchange power on the basis of control data generated by the central control apparatus 100, but all the nodes 10 do not necessarily have to interchange power in accordance with the control data generated by the central control apparatus 100.

Figure 6:
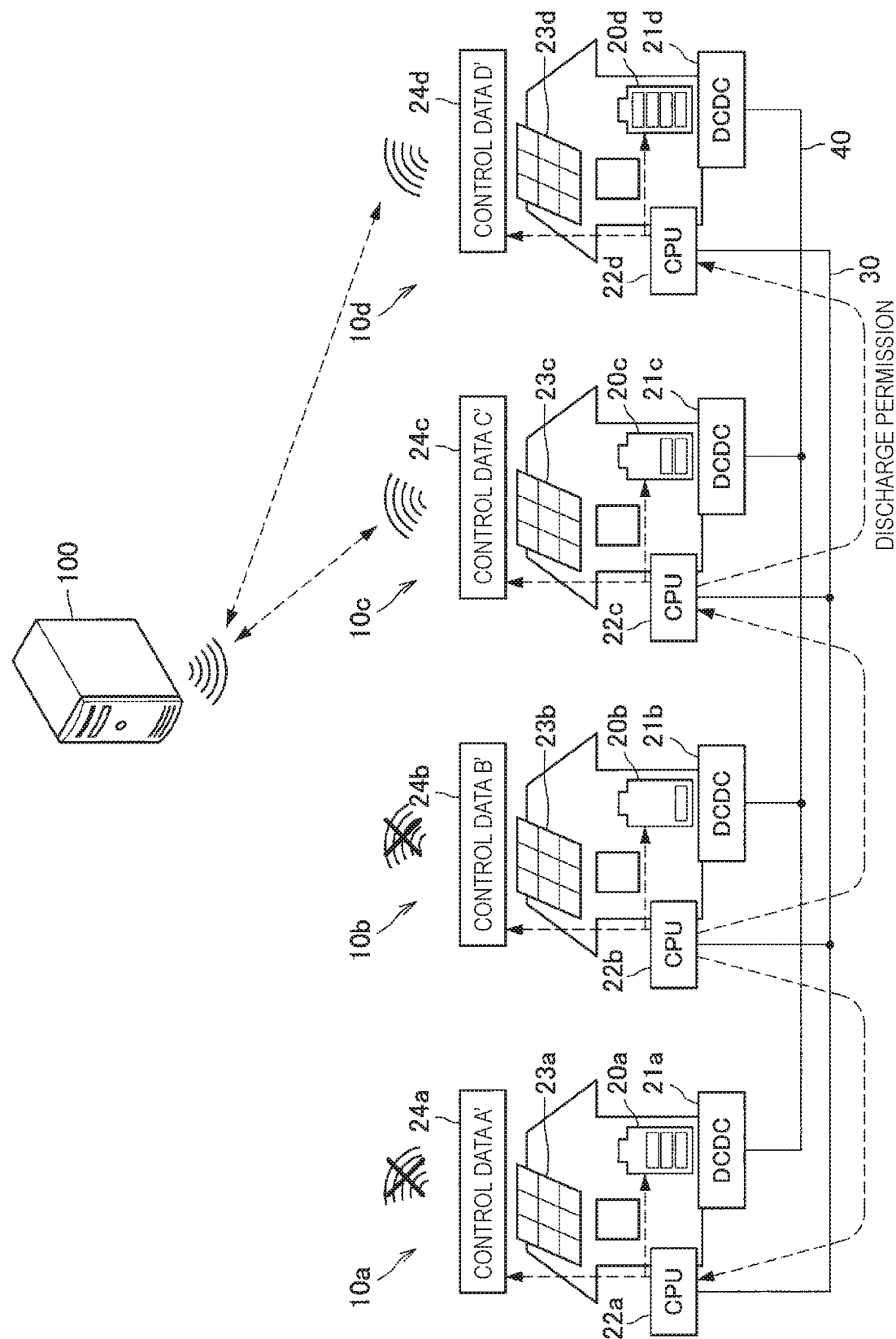
FIG. 6 is an explanatory diagram illustrating an example of the power supply system in a case where only some of the nodes interchange power in accordance with the control data generated by the central control apparatus 100.

FIG. 6 is an explanatory diagram illustrating an example of the power supply system in the case where only some of the nodes interchange power in accordance with the control data generated by the central control apparatus 100.

In the example illustrated in FIG. 6, the nodes 10a and 10b interchange power in accordance with not the control data generated by the central control apparatus 100, but control data uniquely retained in the nodes 10a and 10b, respectively. The nodes 10c and 10d interchange power in accordance with the control data generated by the central control apparatus 100. Power is interchanged between the respective nodes irrespective of the presence or absence of a connection to the central control apparatus 100. Thus, if the conditions of the remaining power level of a storage battery and control data are met, power can also be interchanged between the node 10b and the node 10c.

Even if a communication failure occurs between the central control apparatus 100 and each node, and the central control apparatus 100 becomes incapable of providing control data to the node, the node can interchange power on the basis of control data provided from the central control apparatus 100 before the failure occurs or control data uniquely retained therein.

Figure 7:
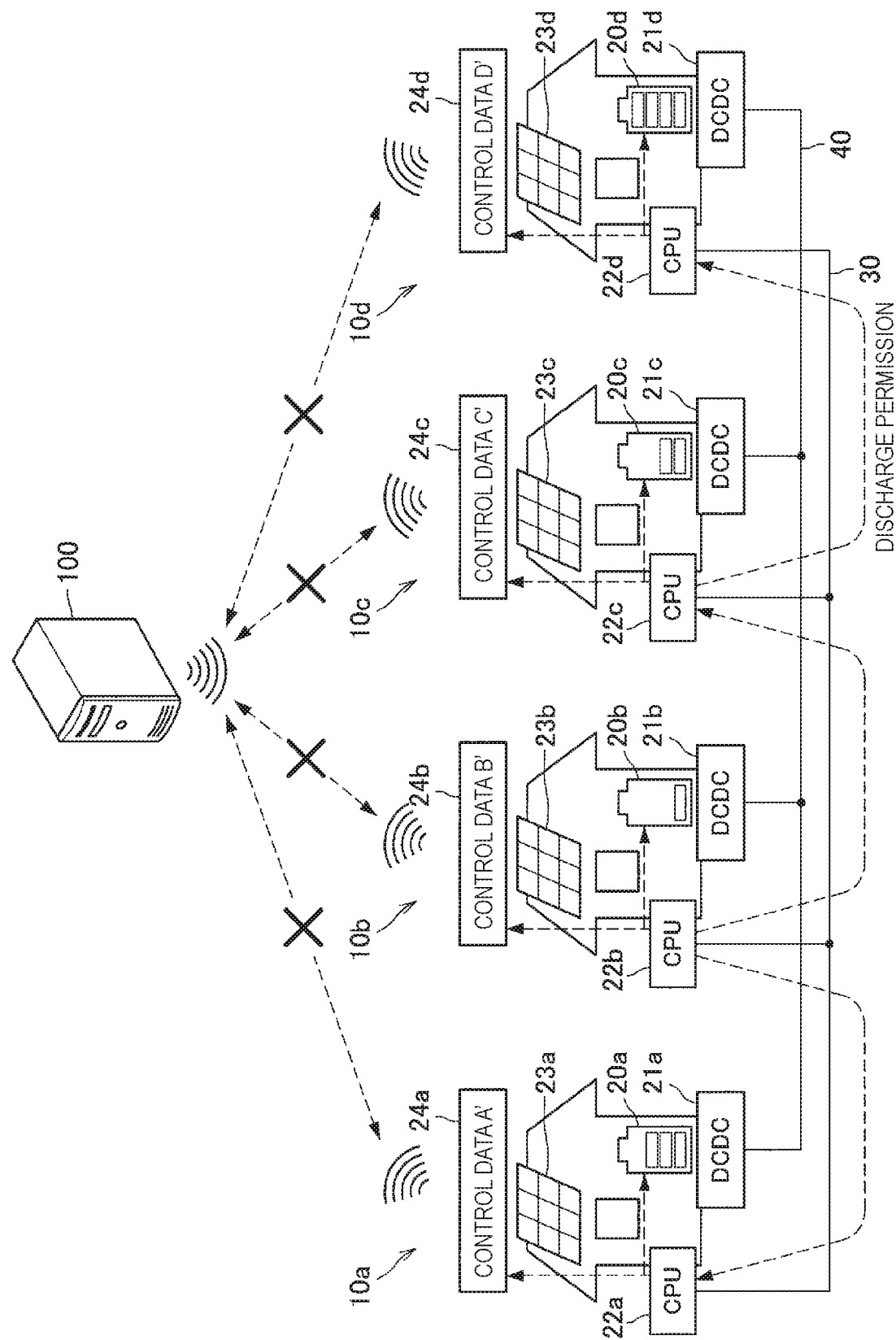
FIG. 7 is an explanatory diagram illustrating an example of the power supply system in a case where a communication failure occurs between the central control apparatus 100 and each node.

FIG. 7 is an explanatory diagram illustrating an example of the power supply system in the case where a communication failure occurs between the central control apparatus 100 and each node. As illustrated in FIG. 7, even if a communication failure occurs between the central control apparatus 100 and each node, the nodes 10a to 10d can transmit a charge request or discharge permission to another node, or receive a charge request or discharge permission from another node on the basis of control data provided from the central control apparatus 100 before the failure occurs or control data uniquely retained therein.

By generating control data to be provided to each node, the central control apparatus 100 can cause the node to interchange power between clusters including a plurality of nodes together. In other words, even if information cannot be exchanged between clusters, it is possible to interchange power between clusters by the central control apparatus 100 generating control data and providing the control data to each node. The following shows the example.

Figure 8:
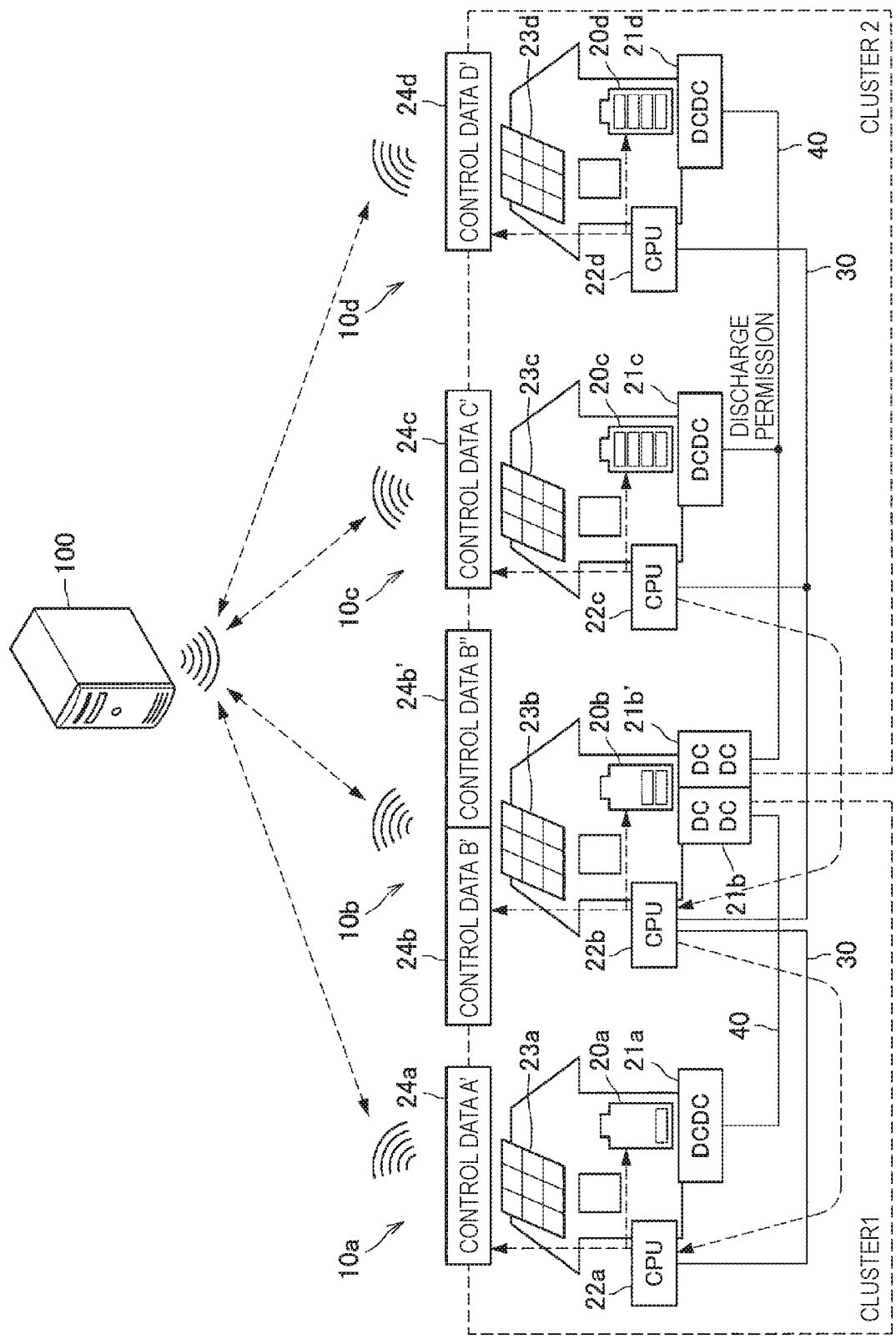
FIG. 8 is an explanatory diagram illustrating an example of the power supply system in a case where the respective nodes are caused to interchange power between clusters on the basis of the control data generated by the central control apparatus 100.

FIG. 8 is an explanatory diagram illustrating an example of the power supply system in the case where the respective nodes are caused to interchange power between clusters on the basis of the control data generated by the central control apparatus 100. In FIG. 8, the node 10b serves as a node that relays a cluster 1 and a cluster 2.

In the case where the power supply system is configured like FIG. 8, the node 10b includes a DC-DC converter 21b for the cluster 1, and a DC-DC converter 21b' for the cluster 2. Note that it is assumed that a node belonging to only the cluster 1 cannot directly exchange information and power with a node belonging to only the cluster 2. In other words, the node 10a cannot directly exchange information and power with the node 10c or the node 10d.

For example, in the case where the remaining capacities of the respective storage batteries 20a and 20b of the nodes 10a and 10b included in the cluster 1 are running short, and the storage batteries 20c and 20d of the nodes 10b, 10c, and 10d included in the cluster 2 have spare remaining capacities, the central control apparatus 100 can generate such control data that power is interchanged from the cluster 2 to the cluster 1 and provide the control data to each node.

For example, in the case where the remaining capacity of the storage battery 20a is running short, the node 10a sends a charge request to the node 10b. The node 10b sends charge requests to the nodes 10c and 10d belonging to the cluster 2. Here, the node 10c is based on the control data generated by the central control apparatus 100 to return discharge permission in response to the charge request from the node 10b and transmit power to the node 10b. Afterward, the node 10b transmits power to the node 10a.

The central control apparatus 100 generates control data for all nodes to provide the control data to each node in this way, and can hereby cause the node to interchange power between clusters.

3. Conclusion

According to an embodiment of the present disclosure as described above, there are provided a central control apparatus capable of efficiently using power generated with natural energy and renewable energy by controlling power interchange for a plurality of nodes and a node that control uses control data from the central control apparatus or its own control data to control exchange of generated energy.

The central control apparatus 100 according to an embodiment of the present disclosure acquires various kinds of information from each node, a cloud and the like, and is based on the information to generate control data to be provided to the node. The central control apparatus 100 generates control data such that power interchange between nodes is optimized in the whole of the power supply system. Then, the central control apparatus 100 provides the generated control data to each node. The central control apparatus 100 regularly generates control data, and regularly provides the generated control data to each node.

Each node is based on the control data generated by the central control apparatus 100 to interchange power, and can hereby efficiently use power generated with natural energy and renewable energy.

Steps in processes executed by the respective devices in this specification are not necessarily executed chronologically in the order described in the sequence chart or the flow chart. In one example, steps in processes executed by the respective devices may be executed in a different order from the order described in the flow chart or may be executed in parallel.

Further, a computer program for causing hardware such as a CPU, ROM, or RAM, incorporated in the respective devices, to execute a function equivalent to each configuration of the above-described respective devices. Furthermore, it is possible to provide a recording medium having the computer program recorded thereon. In addition, the respective functional blocks illustrated in the functional block diagram can be configured as hardware or hardware circuits, and thus a series of processing can be implemented using the hardware or hardware circuits.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control apparatus including:

an acquisition section configured to acquire information regarding consumption of power from a plurality of nodes that store and consume power; and a control section configured to use the information regarding consumption of power to generate data regarding target power storage in each of the nodes, the data being provided to the node.

(2)

The control apparatus according to (1), in which the control section generates data regarding power distribution between power storage apparatuses in the respective nodes as the data regarding target power storage, the power storage apparatuses storing power.

(3)

The control apparatus according to (1) or (2), in which the acquisition section acquires information regarding a power consumption history from each of the nodes as the information regarding consumption of power.

(4)

The control apparatus according to any of (1) to (3), in which the acquisition section acquires information regarding a power consumption prediction from each of the nodes as the information regarding consumption of power.

(5)

The control apparatus according to any of (1) to (4), in which the control section uses the information regarding consumption of power and the data regarding target power storage to determine effectiveness of the data regarding target power storage, the data being provided to each of the nodes in past.

(6)

The control apparatus according to (5), in which when the control section determines that the data regarding target power storage which is provided to each of the nodes in the past is not effective, the control section generates the data regarding target power storage which is different under a same condition.

(7)

The control apparatus according to any of (1) to (6), in which the control section generates data for which a target amount of stored power is set for each time slot as the data regarding target power storage.

(8)

The control apparatus according to (7), in which the control section further generates data for which an interchange partner is designated for each time slot as the data regarding target power storage.

(9)

The control apparatus according to (7) or (8), in which the control section further generates data for which price at time of interchange is designated for each time slot as the data regarding target power storage.

(10)

A control method including:

acquiring information regarding consumption of power from a plurality of nodes that store and consume power; and using the information regarding consumption of power to generate data regarding target power storage in each of the nodes, the data being provided to the node.

(11)

A power storage control apparatus including:

an acquisition section configured to acquire data regarding target power storage, the data being generated in an apparatus to which information regarding consumption of power is provided; and a control section configured to perform control regarding interchange of stored power on a basis of the data regarding target power storage.

(12)

The power storage control apparatus according to (11), in which the control section provides the information regarding consumption of power.

(13)

The power storage control apparatus according to (12), in which the control section provides information regarding a schedule of a user who uses stored power as the information regarding consumption of power.

(14)

The power storage control apparatus according to any of (11) to (13), in which in a case where the acquisition section fails to acquire the data regarding target power storage, the control section performs control on a basis of data regarding target power storage specific to an own apparatus.

(15)

A control method including:

acquiring data regarding target power storage, the data being generated in an apparatus to which information regarding consumption of power is provided; and performing control regarding interchange of stored power on a basis of the data regarding target power storage.

REFERENCE SIGNS LIST 10a to 10d node
30 power line
40 communication line
100 central control apparatus

The invention claimed is:

1. A control apparatus, comprising:
circuitry configured to:
  acquire information from each of a plurality of nodes, wherein
    each of the plurality of nodes includes a power storage apparatus that stores first power,
    the first power is consumable by a corresponding node of the plurality of nodes, and
    the acquired information corresponds to power consumption of the corresponding node of the plurality of nodes;
  generate first data based on the acquired information, wherein
    the generated first data corresponds to first target power storage of the power storage apparatus of each of the plurality of nodes, and
    the generated first data indicates, for each time slot of a plurality of time slots, a target amount of stored power, an interchange partner among the plurality of nodes, and an interchange price;
  transmit the generated first data to each of the plurality of nodes, wherein each of the plurality of nodes stores the transmitted first data; and
  control, based on the transmitted first data, interchange of second power between the power storage apparatus of the corresponding node of the plurality of nodes and the power storage apparatus of the interchange partner of the plurality of nodes, wherein
    the interchange of the second power corresponds to a specific time slot of the plurality of time slots, and
    the interchange price corresponds to the interchange of the second power.

2. The control apparatus according to claim 1, wherein the acquired information further corresponds to a power consumption history of the corresponding node of the plurality of nodes.

3. The control apparatus according to claim 1, wherein the acquired information further corresponds to a power consumption prediction of the corresponding node of the plurality of nodes.

4. The control apparatus according to claim 1, wherein the circuitry is further configured to determine the generated first data is not effective based on specific information that indicates the power storage apparatus of a specific node of the plurality of nodes is fully charged, and the specific information is based on a history of the acquired information and a history of the generated first data.

5. The control apparatus according to claim 4, wherein the circuitry is further configured to generate second data based on the determination that the generated first data is not effective, the generated second data corresponds to second target power storage of the power storage apparatus of each of the plurality of nodes, and the generated second data is different from the generated first data under a same condition.

6. A control method, comprising:

acquiring, by circuitry of a control apparatus, information from each of a plurality of nodes, wherein each of the plurality of nodes includes a power storage apparatus, and the acquired information corresponds to power consumption of a corresponding node of the plurality of nodes;

generating, by the circuitry, data based on the acquired information, wherein the generated data corresponds to target power storage of the power storage apparatus of each of the plurality of nodes, and the generated data indicates, for each time slot of a plurality of time slots, a target amount of stored power, an interchange partner among the plurality of nodes, and an interchange price;

transmitting, by the circuitry, the generated data to each of the plurality of nodes; and controlling, by the circuitry based on the transmitted data, interchange of power between the power storage apparatus of the corresponding node of the plurality of nodes and the power storage apparatus of the interchange partner of the plurality of nodes, wherein the interchange of the power corresponds to a specific time slot of the plurality of time slots, and the interchange price corresponds to the interchange of the power.

7. A power storage control apparatus, comprising:

circuitry configured to:

transmit information to an apparatus, wherein the transmitted information corresponds to power consumption of a node of a plurality of nodes, and the power storage control apparatus corresponds to the node of the plurality of nodes;

acquire first data from the apparatus, wherein the first data is based on the transmitted information and first target power storage of a power storage apparatus of each of the plurality of nodes, and the first data indicates, for each time slot of a plurality of time slots, a target amount of stored power, an interchange partner among the plurality of nodes, and an interchange price;

store the acquired first data; and control, based on the stored first data, interchange of power between the power storage apparatus of the node of the plurality of nodes and the power storage apparatus of the interchange partner of the plurality of nodes, wherein the interchange of the power corresponds to a specific time slot of the plurality of time slots, and the interchange price corresponds to the interchange of the power.

8. The power storage control apparatus according to claim 7, wherein the power consumption of the node is based on a user schedule.

9. The power storage control apparatus according to claim 7, wherein the circuitry is further configured to control the interchange of the power based on second data and a failure of the acquisition of the first data from the apparatus, the second data is specific to the node, and the second data corresponds to second target power storage of the power storage apparatus of the node.

10. A control method, comprising:

transmitting, by circuitry of a power storage control apparatus, information to an apparatus, wherein the transmitted information corresponds to power consumption of a node of a plurality of nodes, and the power storage control apparatus corresponds to the node of the plurality of nodes;

acquiring, by the circuitry, data from the apparatus, wherein the data is based on the transmitted information and target power storage of a power storage apparatus of each of the plurality of nodes, and the data indicates, for each time slot of a plurality of time slots, a target amount of stored power, an interchange partner among the plurality of nodes, and an interchange price;

storing, by the circuitry, the acquired data; and controlling, by the circuitry based on the stored data, interchange of power between the power storage apparatus of the node of the plurality of nodes and the power storage apparatus of the interchange partner of the plurality of nodes, wherein the interchange of the power corresponds to a specific time slot of the plurality of time slots, and the interchange price corresponds to the interchange of the power.

11. The power storage control apparatus according to claim 7, wherein each node of the plurality of nodes comprises a direct current-direct current (DC-DC) converter connected to a power line, and the circuitry is further configured to:

control the DC-DC converter of the node based on the stored first data; and control, based on the control of the DC-DC converter, the interchange of the power between the power storage apparatus of the node and the power storage apparatus of the interchange partner.

* * * * *